United States Patent [19]
Schrade

[11] 3,868,298
[45] Feb. 25, 1975

[54] COMPOUND PANEL

[75] Inventor: Jean Schrade, Zurich, Switzerland

[73] Assignee: Swiss Aluminum Ltd., Chippis, Switzerland

[22] Filed: May 18, 1972

[21] Appl. No.: 254,675

[30] Foreign Application Priority Data
May 19, 1971 Switzerland.......................... 7368/71

[52] U.S. Cl................. 161/161, 156/309, 156/313, 161/151, 161/158, 161/213, 161/220, 161/403, 161/250, 161/DIG. 5, 161/168, 161/162, 162/155, 162/156

[51] Int. Cl.............................................. B32b 5/16

[58] Field of Search ...... 161/DIG. 5, 403, 151, 158, 161/162, 213, 220, 161, 168; 156/309, 313

[56] References Cited
UNITED STATES PATENTS

| | | | |
|---|---|---|---|
| 2,361,438 | 10/1944 | Turner | 161/213 |
| 2,728,702 | 12/1955 | Simon et al. | 161/213 |
| 2,956,651 | 10/1960 | Allred et al. | 161/DIG. 5 |
| 3,031,046 | 4/1962 | Hoadley | 161/DIG. 5 |
| 3,150,032 | 9/1964 | Rubenstein | 161/DIG. 5 |
| 3,271,222 | 9/1966 | Moorman | 161/DIG. 5 |
| 3,549,468 | 12/1970 | Messineo et al. | 161/DIG. 5 |
| 3,608,010 | 9/1971 | Stayner | 161/DIG. 5 |
| 3,676,288 | 7/1972 | Hoyle | 161/DIG. 5 |

Primary Examiner—George F. Lesmes
Assistant Examiner—James J. Bell
Attorney, Agent, or Firm—Ernest F. Marmorek

[57] ABSTRACT

A compound panel comprising two facing layers each of metal, and between the facing layers a core containing an organic binder and at least one layer of inorganic fibre together with hollow particles of closed-cell type.

5 Claims, 4 Drawing Figures

COMPOUND PANEL

It is known to produce compound panels by a continuous process in which a thermoplastic synthetic plastics panel is extruded and then a metal strip is continuously stuck onto each face of the panel. It is also known to introduce foam synthetic plastics material continuously between two flat or pre-shaped metal strips held at a constant spacing.

In all known continuously produced compound materials with metal facings, the core consists of a cohexive largely isotropic material which likewise is produced by a continuous process.

On the other hand what are called laminated materials also come into consideration as core material for compound panels. Laminated materials with paper or cotton fabric are sensitive to water, and those with papers or fabrics of inorganic fibres are of high specific weight and expensive per unit of volume. Laminated materials of inorganic fibres and phenolic plastics or aminoplats have however very good fire resistance. Therefore it has already been proposed to produce compound panels with aluminium outer facings and a core of phenol or melamine resin, which is filled with mineral powders or fibres. The production of panels using such a core material is discontinuous. Furthermore, if sufficient mechanical strength is to be achieved, relatively high pressures and long pressing times of about thirty minutes have to be employed to bond the facings to the core.

The invention relates to compound panels which are refractory and light and can be produced in a simple and economical manner by a continuous process.

A panel according to the invention comprises two facing layers each of metal, and between the facing layers a core containing an organic binder and at least one layer of inorganic fibre together with hollow particles of closed-cell type.

The hollow particles can be small spheres or be irregularly shaped, and can consist of organic or preferably of inorganic material. They effect a reduction of the apparent density of the inorganic fibre layer. Preferably the particles are sphere having a diameter less than 1 mm.

Each fibre layer can consist for example of asbestos, glass or rock wool fibres or mixtures thereof. A paper with a thickness of 0.5 to 3 mm. is preferably produced from these fibres, into which the hollow particles are introduced during production. During the paper production a small quantity of the binder is advantageously added in order to improve the cohesion between fibres and hollow particles. The hollow particles can be introduced into the fibre layer as such or as unexpanded small spheres which expand into hollow spheres only subsequently under the action of heat, for example in the pressing of the compound panel. An especially suitable paper consists, by weight, of 1 – 25 parts of rock wool fibres, 1 – 25 parts of asbestos fibres, and 0.5 – 25 parts of hollow particles.

The core of the compound panel is preferably built up from several such papers. The organic binder for the sticking of the paper layers and sticking on of the facing layers can be laid in the form of foils between the individual layers, or the papers are already impregnated with the binding agent on the paper machine, or in a separate working operation. In the latter cases a separate adhesive layer, suited to the facing metal, can be inserted between each facing layer and the outermost layer of the core. This adhesive layer can be introduced in the form of a foil, or be applied previously from solution, emulsion, by extrusion etc. onto the metal sheet.

The binder should be such that the compound panel is not water-absorbent in subsequent use. It can be a thermoplastic or settable synthetic plastics material or equally a natural substance.

With the aid of the papers as described, the compound panel can be produced continuously, in that the papers, the binding agent foils if present, and the facing layers are unrolled from supply rolls and fed together to a laminating device, where they are bonded together under pressure and heat.

EXAMPLE 1

Figure 1:
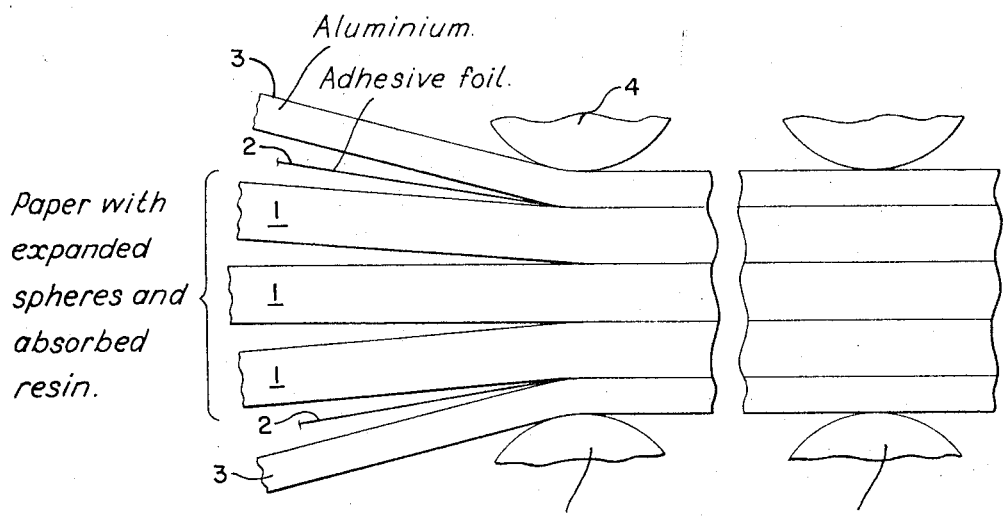
FIG. 1 is a fragmentary large scale side elevational view of a compound panel in accordance with one embodiment of the present invention.

Reference is had to FIG. 1

A paper of 1.0 mm. thickness and weight of 400 g/sq.m., containing, by weight, 20 parts rock wool, 15 parts asbestos fibres, and 15 parts mineral hollow small spheres, such as are obtainable on the market under the name PERLITE, is drawn through an aqueous phenol-melamine resin solution and then is dired. The resin absorption measured after drying should amount to 220 g/sq.m. Three webs of this impregnated paper 1 as core material, and an adhesive foil of gum-modified phenol resin 2 and an aluminium strip 2 of 0.6 mm. thickness on each side of the core, are drawn together through a system of lining rolls 4 and thereby are bonded together at 200°C. under a pressure of 8 kg/sq. cm. The length of the roll system (number of rolls 4), and the speed of passage, are selected so that the binder is completely cross-linked on emergence from the roll system. A stiff, plane, endless compound panel is produced. Its core has a bulk density of 0.7 g/cc. and is extraordinarily resistant to the action of fire.

EXAMPLE 2

Figure 2:
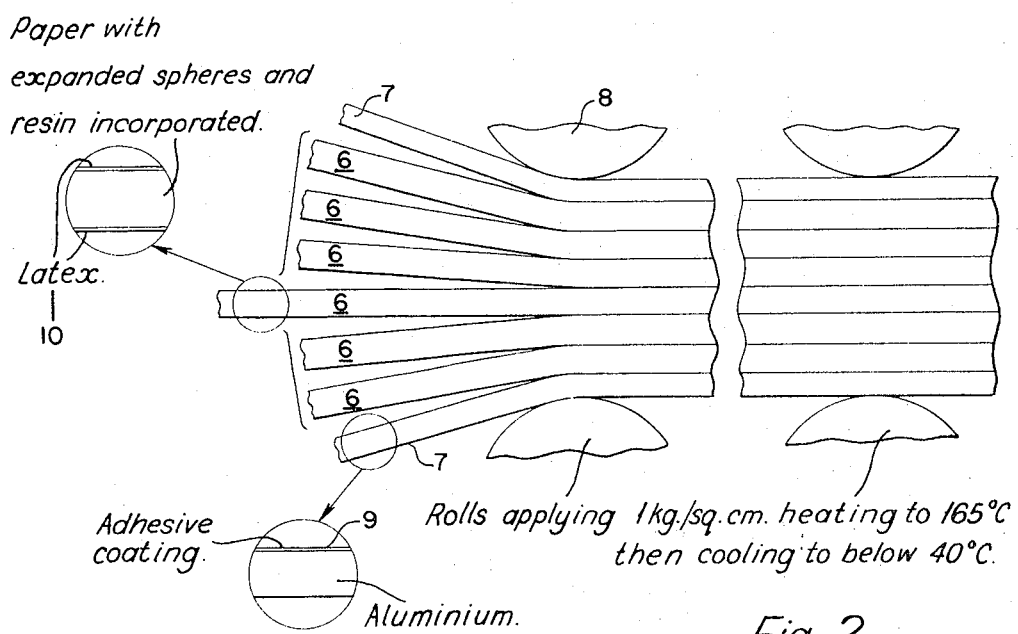
FIG. 2 is a side elevational view similar to FIG. 1 but embodying a modification and including portions shown separately on a still larger scale.

Reference is had to FIG. 2.

A paper 6 of 0.5 mm. thickness and weight of 180 g/sq.m. is produced on a paper machine from 18 parts of rock wool, 7 parts of phenol resin small hollow spheres, which are on the market under the name "microballoons," 17 parts asbestos, and 10 parts of a natural resin which is obtained in the production of colophony and is on the market under the name VINSOL. This paper 6 is immediately thereafter coated in a latex of layer 10 synthetic rubber with 40 g./sq.m. of binder. Six such pre-treated webs are continuously stuck together, between two aluminium sheet strips 7 of 0.4 mm. thickness each coated on the side towards the core with 40 g/sq.m. of a gum-modified phenol resin adhesive coating 9. This is carried out in a multi-roll system including rolls 8 in such a way that, under a pressure of 1 kg/sq.cm., firstly the entire compound panel is heated to 165°C. and then it is cooled down again to below 40°C.

EXAMPLE 3

Figure 3:
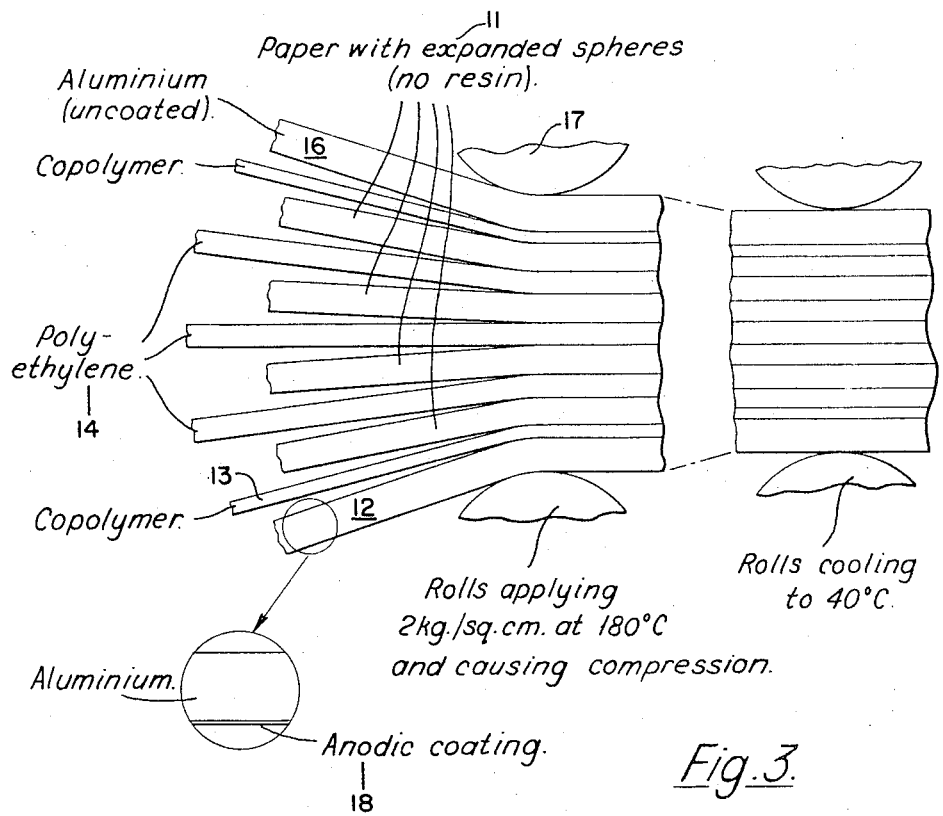
FIG. 3 is a side elevational view similar to FIG. 2 but embodying a further modification.

Reference is had to FIG. 3.

A paper 11 of 1.5 m. width, 0.5 mm. thickness and a weight of 200 g./sq.m. is produced, of the composition according to Example 1, and is rolled up. For the production of compound panels the following layers, all 1.5 mm. width, are unrolled and stratified one upon the other: An aluminium strip 20 of 0.6 mm. thickness which has been anodised on one side, anodic coating 18 downwards; above this a foil 13 of an ethylene acrylic acid copolymer of 0.2 mm. thickness; then a paper 11 as initially mentioned; next a foil 14 of polyethylene of lower density and 0.4 mm. thickness; thereafter paper 11-polyethylene foil 14-paper 11-polyethylene foil 14-paper 11; then finally a copolymer foil 13 and an aluminium sheet of 0.6 mm. thickness, but in this case without eloxal coating. The pack of layers is fed continuously into a continuous press of rolls 17 which generates a pressure of 2 kg./sq.cm. and is heated to 180°C. The speed of passage is regulated so that the time of residence in the press amounts to 70 seconds. Then follows a continuous press which cools the compound panel within 35 seconds to 40°C. The compound panel of 4.2 mm. thickness is then finished, absolutely flat and is cut to the desired length. In comparison with a core material of pure polyethylene, a laminated material of such formation has the advantage that the core material has better resistance to the action of fire, that is to say it does not drop.

EXAMPLE 4

Figure 4:
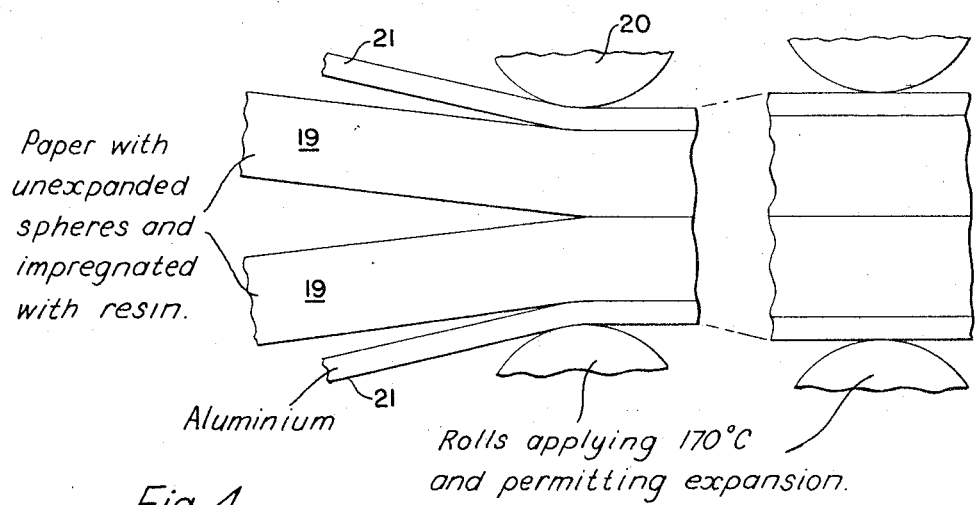
FIG. 4 is a side elevational view of yet a further embodiment of the present invention.

Reference is had to FIG. 4.

A light-weight paper 19 of 1.5 mm. thickness and a weight of 400 g./sq.m. is produced from a mixture, by weight, of 55 parts rock wool, 3 parts unexpanded small hollow spheres of polyvinylidene chloride mixed polymer, and 35 parts asbestos, and is impregnated directly on the paper machine with an alcoholic phenol resin, and then dried at a temperature not exceeding 90°C. The paper 19 then contains 45% phenol resin. Two aluminium strips 21 pre-treated as in Example 2 are supplied from above and beneath onto two layers of this impregnated paper 19, and fed at 170°C. through a system of rolls. Under the action of heat the spheres contained in the paper expand. The gap of the rolls 20 is adjusted accordingly. On emergence of the panel from the roll system, the phenol resin has set to extent that any subsequently necessary setting can be carried out without pressure, without variation of shape. The endless compound panel produced has a bulk density of 1.3, has low reverberation, and has very good resistance to fire.

The materials PERLITE, "micro-balloons" and VINSOL are obtainable respectively from Perlite Inc. USA, Union Carbide Corp. New York, USA and Hercules Inc. Wilmington, USA.

What I claim is:

1. A laminated panel comprising two facing layers each of metal and between the facing layers a core layer, said core layer consisting essentially of more than one inorganic fibrous sheet impregnated with an organic resinous binder and containing hollow particles of the closed-cell type.

2. A panel according to claim 1, in which the particles are spheres having a diameter less than 1 mm.

3. A panel according to claim 1, in which each sheet of inorganic fibre and particles comprises, by weight, 1 to 25 parts of rock wool fibres, 1 to 25 parts of asbestos fibres and 0.5 to 25 parts of hollow particles.

4. A panel according to claim 1 including a layer of adhesive between each facing layer and the core layer.

5. A laminated panel comprising two facing layers each of metal and between the facing layers a core layer, said core layer consisting essentially of more than one web of inorganic fibres and hollow particles of the closed cell type, the web being impregnated with an organic resinous binder.

* * * * *